(12) United States Patent
Yang et al.

(10) Patent No.: US 8,963,497 B2
(45) Date of Patent: Feb. 24, 2015

(54) CORDLESS TOOL SYSTEM

(75) Inventors: Dezhong Yang, Nanjing (CN); Qichun Zhang, Nanjing (CN); Haishen Xu, Nanjing (CN); Junya Duan, Nanjing (CN); Hao Du, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 376 days.

(21) Appl. No.: 13/405,700

(22) Filed: Feb. 27, 2012

(65) Prior Publication Data
US 2012/0227994 A1    Sep. 13, 2012

(30) Foreign Application Priority Data

Mar. 8, 2011 (CN) .......................... 2011 1 0055218
Mar. 8, 2011 (CN) .......................... 2011 1 0055219
Mar. 8, 2011 (CN) .......................... 2011 1 0055520
Mar. 8, 2011 (CN) .......................... 2011 1 0055533

(51) Int. Cl.
*H02J 7/00* (2006.01)
*A01D 69/02* (2006.01)

(52) U.S. Cl.
CPC ..................................... *A01D 69/02* (2013.01)
USPC .......................................................... 320/113

(58) Field of Classification Search
USPC ......................................... 320/114, 112, 113
See application file for complete search history.

(56) References Cited

U.S. PATENT DOCUMENTS

| | | | |
|---|---|---|---|
| 2003/0201754 A1* | 10/2003 | Conrad .......................... | 320/116 |
| 2004/0070369 A1* | 4/2004 | Sakakibara .................... | 320/128 |
| 2005/0007068 A1* | 1/2005 | Johnson et al. ................ | 320/110 |
| 2007/0029972 A1* | 2/2007 | Lampe-Onnerud et al. .. | 320/132 |
| 2010/0171067 A1* | 7/2010 | Hu et al. ......................... | 252/67 |
| 2013/0026969 A1* | 1/2013 | Kim et al. ...................... | 320/103 |

FOREIGN PATENT DOCUMENTS

CN           002090525 U  * 12/1991  ............... G01K 7/00

* cited by examiner

*Primary Examiner* — Richard V Muralidar
*Assistant Examiner* — David Henze-Gongola
(74) *Attorney, Agent, or Firm* — Greenberg Traurig, LLP

(57) ABSTRACT

A tool discharges one battery pack and a charger simultaneously charges another battery pack to provide for continuous and circular operation of the tool. The ratio of the discharging time to the charging time is approximately 25:35.

14 Claims, 14 Drawing Sheets

CORDLESS TOOL SYSTEM

RELATED APPLICATION INFORMATION

This application claims the benefit of CN 201110055533.6, filed Mar. 8, 2011, CN 201110055520.9, filed Mar. 8, 2011, CN 201110055218.3, filed Mar. 8, 2011, and CN 201110055219.8, filed Mar. 8, 2011, each of which is incorporated herein by reference in its entirety.

BACKGROUND

Battery-powered tools, such as cordless electric lawn mowers, cordless electric mitre saws, cordless electric table saws, etc. have become more widely accepted for their environment-protection qualities and portability. However, the capacity of the battery is limited, thus for example when using a cordless mower, the mowing cannot be accomplished with a single battery pack, or even two battery packs if the area of the lawn is large. Additionally, the battery pack tends to heat up after continuous and circular use, especially in a high-temperature environment, thus it may take longer to recharge the battery. To solve the above problems, a user often prepares several battery packs and a corresponding number of chargers in order to charge several battery packs at once. However, using several battery packs is much more expensive for users.

SUMMARY

The present invention provides a cordless system, which can extend the discharging time and shorten the charging time of the battery pack for a cordless electric tool, thereby allowing for continuous and circular discharging. One notable advantage of this system is that an uninterrupted electrical system can be obtained safely and at a low-cost.

The invention comprises a cordless system for an electric tool with a power of equal to or more than 300 watt including a charger and at least two lithium battery packs which may alternately discharge electricity to the tool in a circular and uninterrupted manner.

Preferably, the operating steps include at least:
disposing a first battery pack on the tool for discharging;
disposing a second battery pack on the charger for charging; removing the second battery pack from the charger and disposing it on the tool for discharging continuously after the first battery pack is discharged; and
disposing the first battery pack on the charger for charging. The working time of the battery packs is equal to or more than the charging time of the battery packs.

DETAILED DESCRIPTION

Figure 1:
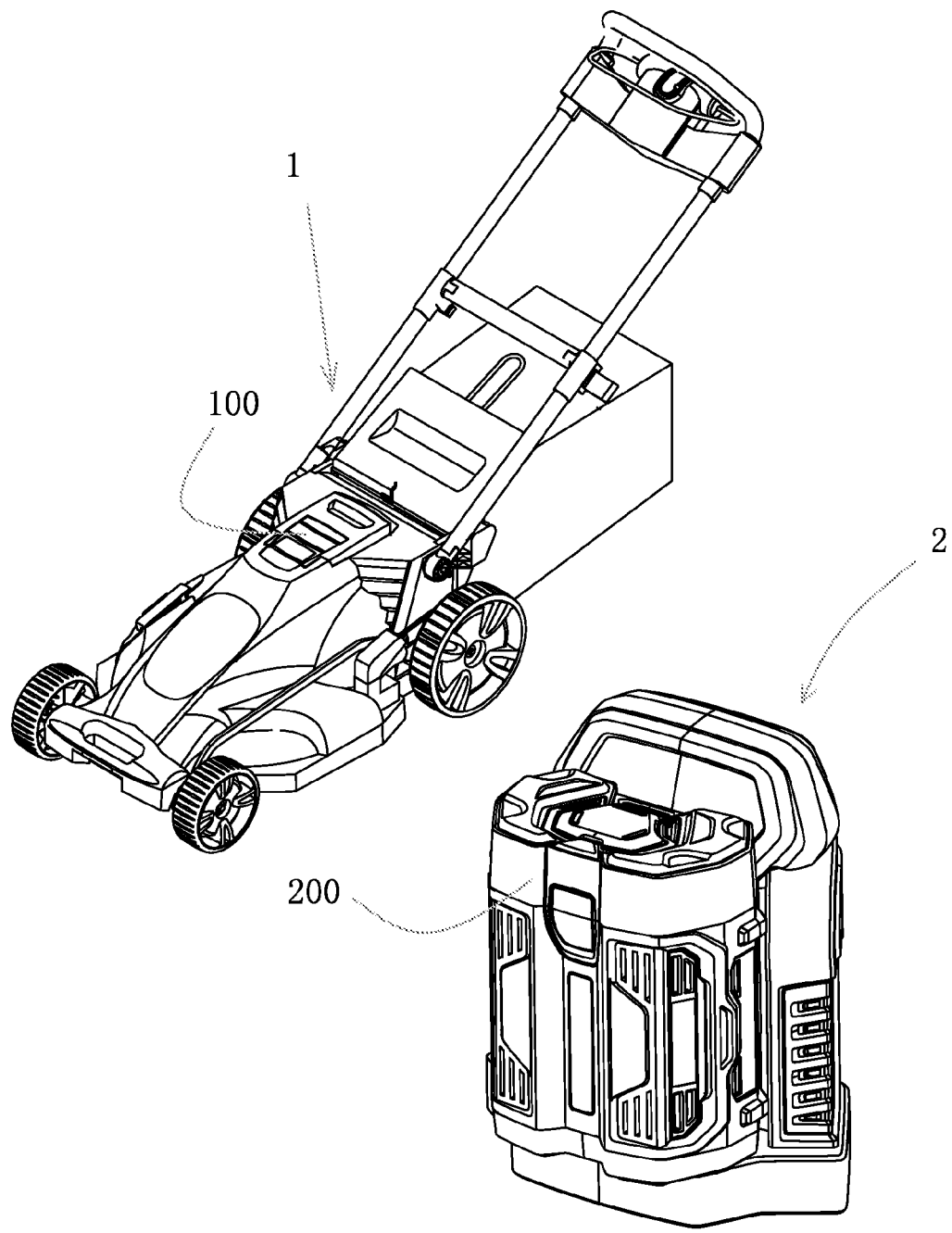
FIG. 1 is an illustrative view showing an exemplary cordless system comprised of a cordless mower with one battery pack and a charging system for charging another battery pack.
Figure 2A:
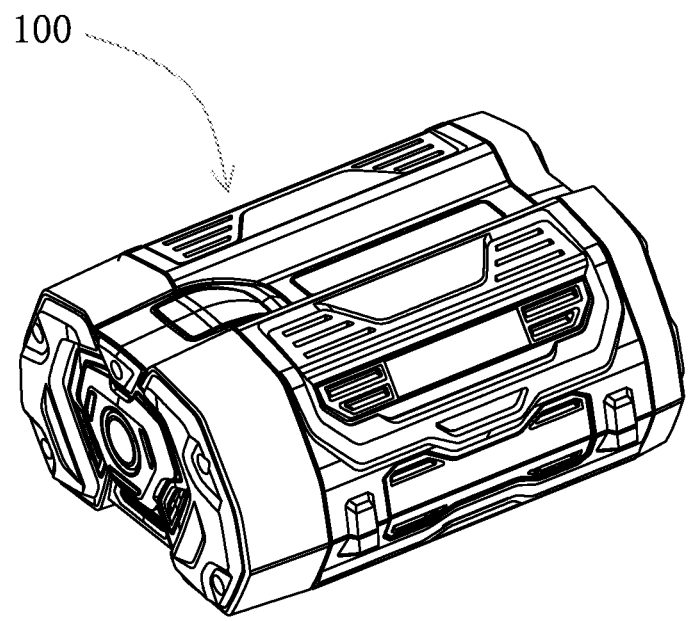
FIGS. 2a and 2b are each an illustrative view showing the top view and the bottom view of the battery pack, respectively.
Figure 2B:
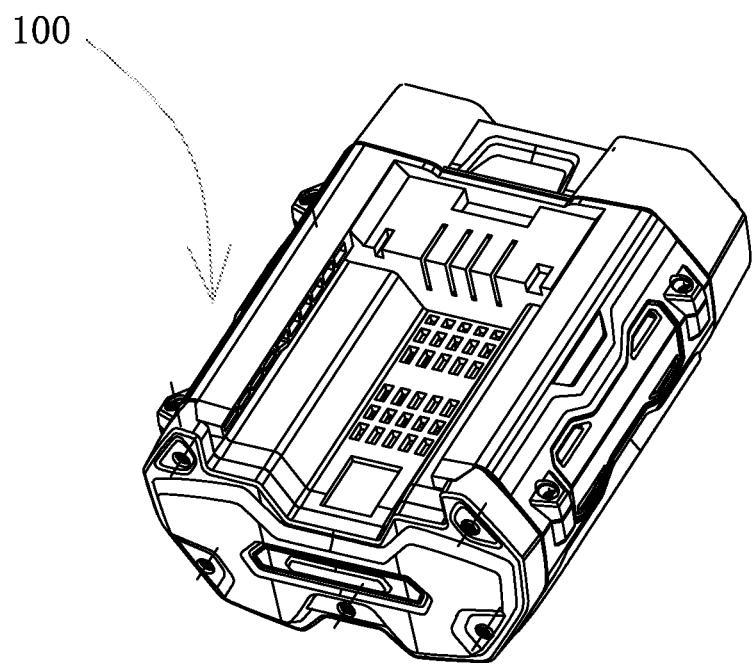

As illustrated in FIG. 1, a cordless system according to an illustrated embodiment comprises a cordless mower 1, equipped with a removable battery pack 100 and a charger 2 for charging a battery pack 200. The mower 1 may include a driving mechanism for driving a blade, a motor, a main controller, a display with an user interface, and a connecting mechanism for engaging with the battery pack. In this embodiment, the battery pack 100 is used to supply power to the motor and the driving mechanism. While the first battery pack 100 discharges, a second battery pack 200 is charged by a charger 2 so that the second battery pack 200 is fully charged and ready to use after the first battery pack 100 is fully discharged.

Figure 3:
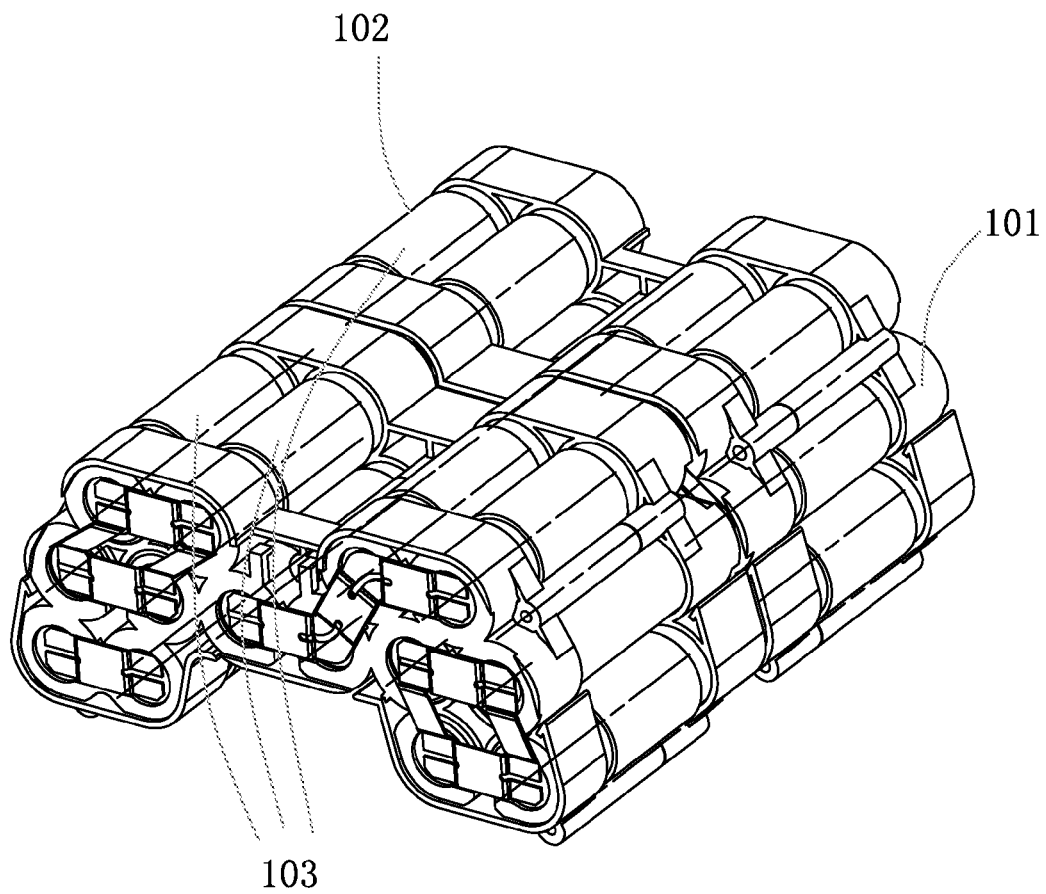
FIG. 3 is a cross-sectional view showing the inner structure of the battery pack.

As shown in FIG. 3, a battery pack 100 of the cordless system comprises two parallel battery groups of multiple 18650 lithium battery cells 102. Preferably, each battery cell 102 has a nominal voltage of 4 V (or 3.6 V, or 4.2 V), and a capacity of approximate 2 Ah, and the battery cells have an average discharging current of 6 A. Each battery group is composed of fourteen battery cells 102 in series. In this embodiment, a battery pack 100 has a nominal voltage of 56V and a battery capacity of approximate 4 Ah. In this embodiment, a battery pack 100 may keep a cordless mower running continuously for 25 to 30 minutes. It may take 30 to 35 minutes to charge the battery pack, and thus the ratio of the discharging time to the charging time is approximately 25:35. Under these conditions, the charging time will be greater than or equal to the discharging time. However, during the mowing operation, the user generally needs to intermittently remove the grass from the cordless mower. While the user works continuously, after accounting for the additional time it takes to remove grass, the working time of the battery pack is greater than or equal to the charging time and the user may use the two battery packs 100, 200 continuously and circularly by simultaneously discharging and charging the respective battery packs.

A conventional battery pack used in a common portable power tool can work for a period of time. Such a battery pack has a short working time when it is used in a power tool having an average discharging current of nearly 12 amps or even 50 amps and a power of nearly 300 watt or nearly 500 watt or above. This then requires the user to stop working to charge the battery pack or prepare many battery packs to continue the work.

The subject system overcomes said disadvantages and solves said problems by providing battery pack power for cordless tools with nominal voltages of 36 V, 48 V, 50.4 V, 52 V, 56 V, 58.8 V, 60 V, 64 V, 72 V, 80 V, 100 V, 112 V or above. The subject system makes it possible for a user to work continuously using two battery packs in a mitre saw, or a table saw or other high-power tools. For example, the battery packs used in a mitre saw, the ratio of the discharging time to the charging time is approximately 1:2 or above, and the motor of the saw will be stopped during times when the user adjusts a workpiece, and the time of powering the saw and adjusting the workpiece is nearly equal to the discharging time of the battery pack. That is to say, while the user works continuously, after accounting for the additional time it takes to adjust a workpiece, the working time of the battery pack used in a saw is nearly equal to or greater than the charging time of the battery pack. The present invention allows for continuous and circular operation of a high-power cordless tool with two battery packs.

In another embodiment, to extend the working time of the battery pack, each battery pack may be comprised of more battery cells. Alternatively, the battery pack may be comprised of other battery cells having higher capacity, so that each battery pack has a battery capacity of more than 4 Ah. For example, each battery pack may include three parallel groups of lithium battery cells, such that each group has multiple series lithium battery cells.

In the illustrated embodiment, the battery pack also includes a heat absorbing device. As shown in FIG. 3, a battery bracket 101 and a plurality of lithium battery cells 102 are arranged in the housing of the battery pack 100 which has an approximately bow shape cross section. The outer surfaces of the battery cells are respectively wrapped with plastic bags 103 which have phase change materials encapsulated therein. The plastic bags have a thickness of nearly 1 mm and a length of nearly 30 mm, and the specific size may be adjusted depending on the size and arrangement of the battery cells. In this embodiment, the materials encapsulated in the plastic bags 103 comprise the mixture of 80%-90% sodium acetate, 1%-5% sodium dodecyl benzene sulfonate, 1%-5% carboxymethyl cellulose, and 1%-5% sodium carbonate. The mixture is broken into pieces and mixed evenly, and then encapsulated by the plastic bags 103. The weight of the materials in each bag is nearly 2 g, and the components and the may be changed proportionally according to particular conditions. In this embodiment, when the temperature of the battery pack 100 exceeds 40 deg. C. the phase change materials will cool down the rising temperature of the battery pack 100, so that the temperature of the battery may be kept below the protection temperature of 70 deg. C. After the battery pack, 100 has been completely discharged, the heat absorbing device will promote quick heat dissipation while the battery pack 100 is re-charging. Thus the heat absorbing device ensures a longer discharging time, and a shorter re-charging time. Additionally, the heat absorbing device will extend the work life of the battery, while also making it possible to operate the cordless mower continuously and circularly by simultaneously discharging and charging the respective battery packs.

In other embodiments, the plastic bags of the heat absorption device may contain other phase change materials. For example, the plastic bags may contain a mixture of 90%-99% polyethylene glycol and 1%-10% cda cellulose diacetate. In another embodiment, the plastic bags may contain a mixture of 90%-99% polyethylene glycol and 1%-10% chitosan, or another thickener.

Figure 4A:
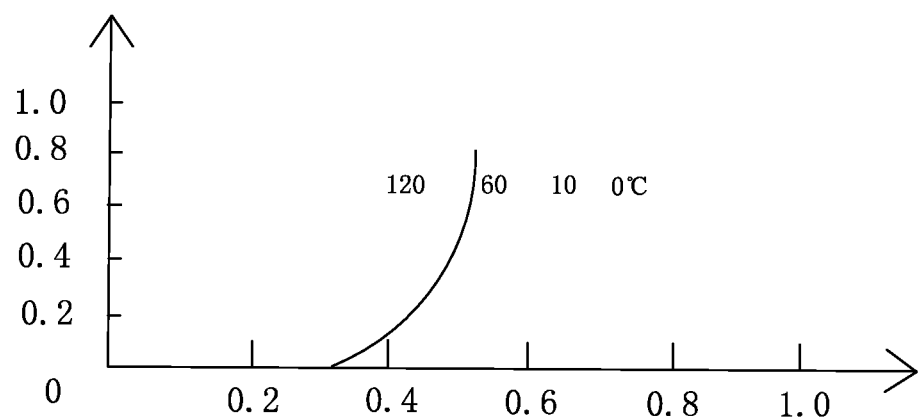
FIG. 4a is a diagram illustrating the relationship between the volt-ampere characteristic of PN junctions and the temperature of the battery pack.
Figure 4B:
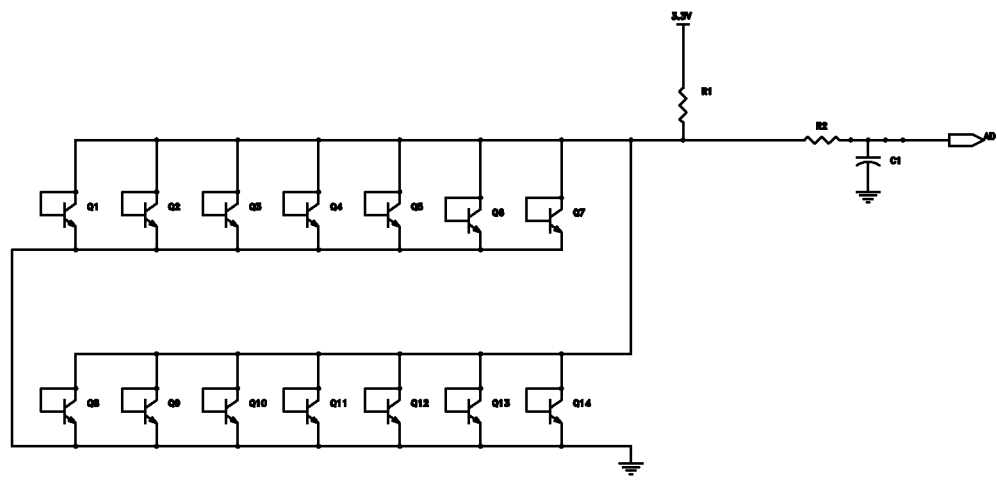
FIG. 4b is a diagram illustrating temperature measuring circuit in the battery pack.

To use the tool safely and to maximize the work life of the lithium battery pack, the battery pack should not be operated when its temperature is too high, or when the temperature difference between the battery cells within the battery pack is too large. Thus the temperature of each lithium battery cell must be monitored during charging and discharging. As shown in FIG. 4b, the battery pack of the illustrated embodiment uses NTC temperature measurement and triode temperature measurement. Thus the embodiment includes two means of detecting over-heating of the battery pack. The NTC sensor is adhered to the surface of the battery cell that should have the highest rising temperature and the SMD triode with plastic packaging is adhered to the polarity ends of each battery cell. The negative temperature character of PN junction, i.e., the junction voltage of PN junction, may change linearly as the temperature changes. Thus the temperature of the lithium battery cells may be measured by measuring the change of the triode temperature. The present embodiment utilizes the SMD triode with plastic packaging to ensure that the triode temperature measurement circuit is electrically insulated from the positive and negative poles of the lithium battery. In one embodiment the triode is adhered to the polarity ends of the cores of the lithium battery with thermal silica gel, and the triodes are connected in parallel or in series. In this way, at least some of the temperature measuring elements have a same output end. The current of the PN junction of the triode is represented by the equation:

$$i_D = I_S \left( e^{\frac{v_D}{v_T}} - 1 \right)$$

wherein $v_D$ denotes the voltage drop through the two ends of the PN junction, and $i_D$ denotes the current through PN junction.

When the working temperature is changed, the character of the triode would be changed accordingly. As the temperature rises, the current carrier resulting from thermal activation is increased, thus the reverse saturation current $I_s$ is increased. Theoretically, the change of $I_s$ with the change of the temperature is 8% deg. C. for silicon tube and 10% deb. C. for germanium tube.

$$I_S(T_2) = I_S(T_1) 2^{\frac{T_2-T_1}{10}}$$
$$\exp\left(\frac{U}{U_T}\right) = \exp\left(\frac{U_q}{KT}\right)$$

When there is a constant, positive voltage, although the voltage is slightly reduced because the increase of temperature, the $I_s$ increases to greater degree, thus the positive current of PN junction of the triode is increased. If the current is kept constant, the positive voltage must be decreased with the rising of the temperature. Generally, if temperature rises 1 degree, the positive voltage drop of PN junction of the triode would decrease 2-5 mV, i.e. As shown in FIG. 4a, as $$\frac{\Delta U}{\Delta T} \approx -(2 \sim 5) \text{ mV}/^\circ\text{C}.$$

temperature rises, the positive character line may move leftwards, and the positive voltage drop is decreased.

During the charging or discharging of the battery pack, the temperature of the lithium battery cells rise, thus the current through the triode corresponding to the lithium battery cells increases before the voltage of the $v_{DS}$ end of the triode decreases. Hence the currents through other triodes decrease, and the end voltage decreases gradually. Then, the current through the triode of the battery cells that has a high temperature begins to decrease, and the currents through other triodes begin to increase, and finally the end voltage reaches a relatively stable value.

The smaller the current exerted through the triode, the larger the changing rate of the current due to the abnormal temperature rise is, and thus the voltage drop of the temperature rise per unit is larger. Similarly, the higher the abnormal temperature rise is, the larger the changing rate of the current, and thus the voltage drop of the temperature rise per unit is larger. Thus, a microprocessor ("MCU") can collect the voltage through the AD interface, and thereby determine whether any of the lithium battery cells in the battery pack are overheated. Experimental data shows that under the present invention, the higher the abnormal temperature rise of the lithium battery cells, the larger the changing rate of the current. If more battery cells display an abnormal temperature rise is, that is, if the there are more triodes with abnormal temperature rises, there is a smaller voltage drop in the PN junction, and a larger voltage drop of the temperature rise per unit. It has been verified that when the battery cells have a temperature more than 70 deg. C., the voltage drop of the temperature rise per unit is more than 2 mV/deg. C. Thus the MCU can detect the abnormal temperature rise of the core of the lithium battery, thereby avoiding the invalidation and safety problem resulting from the over-thermal lithium battery.

In other embodiments, the elements that are inductive to the temperature, such as diode and heat sensitive resistance with positive temperature coefficient (PTC) may also be used to replace the triode in the solution of the present invention.

Figure 5:
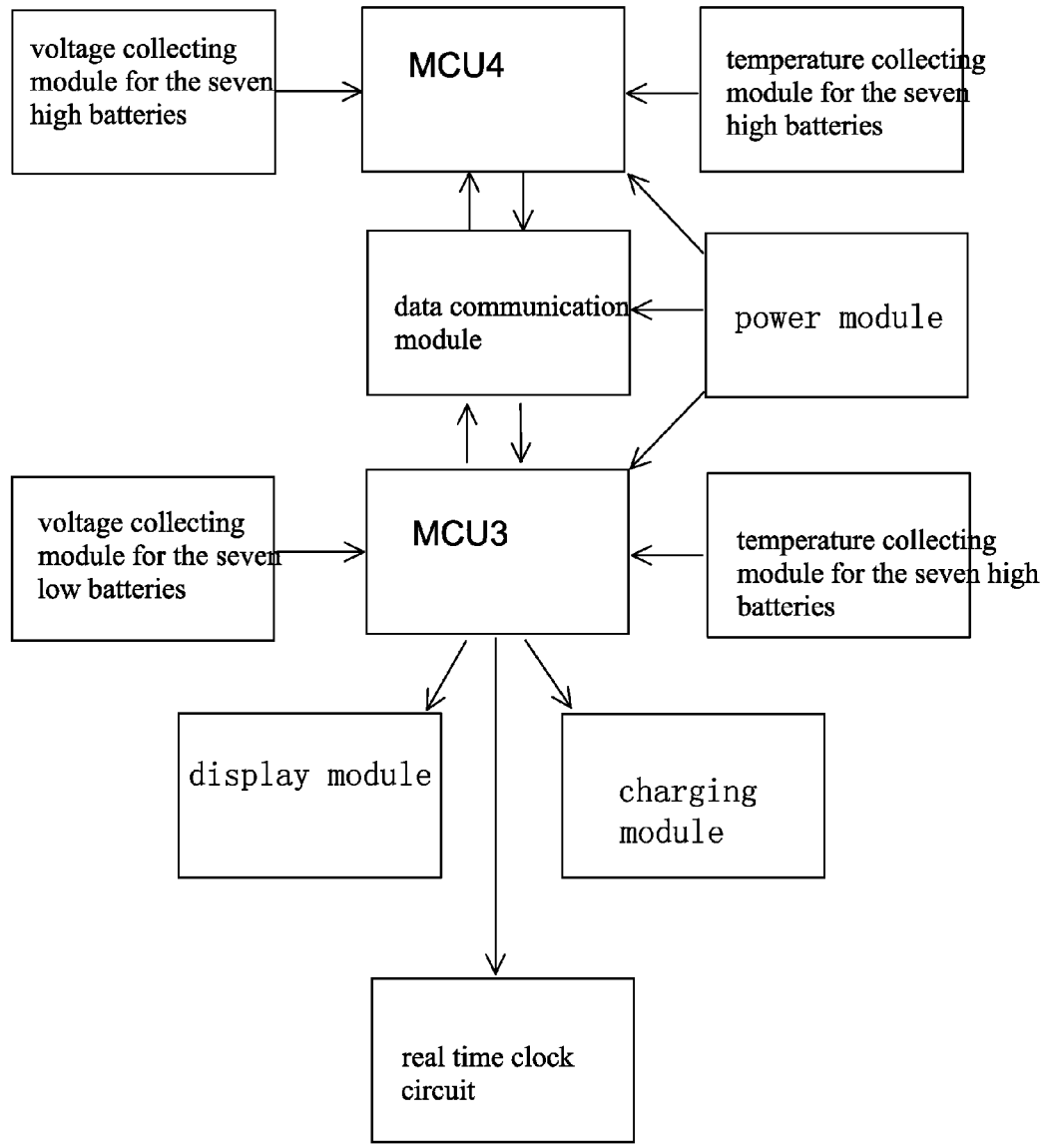
FIG. 5 is a schematic diagram illustrating a voltage monitoring module in the battery pack.

During charging and discharging, the lithium battery pack also needs to monitor the voltage of each battery element to avoid over-discharging and over-charging. As shown in FIG. 5, the illustrated embodiment utilizes two simple MCUs to monitor the voltage of each battery of the fourteen serially-connected batteries. MCU3 obtains real time samplings from seven lower battery cells using a voltage collecting module, and MCU4 obtains real time sampling from the seven upper battery cells using voltage collecting module. MCU3 and MCU4 may transmit data between one-another through a data communication module. The charging module, the charge capacity and the display module of the malfunction indicator light are controlled by MCU3. Generally, the high voltage battery pack which is composed of a plurality of battery cells, needs a MCU with several pins and 16 bits ADC to obtain precise sampling of each battery. The present invention utilizes two MCUs, which minimizes the cost while ensuring the precision and functionality of the sampling.

The power supply for the PCB board may be powered off while the battery pack is discharging in order to save electric energy and enhance the discharging time of the battery pack and the discharging efficiency. The maximum power dissipation of the protection board circuit in the battery pack may be reduced to 1.4 W, which is 50-80% improvement in efficiency over the linear stabilized voltage supply. During discharging, the current through the protection board in the battery pack is nearly zero, which greatly enhances the discharging capability and extends the discharging time of the battery pack (under rated capacity).

In the present invention, all electrical elements on the PCB board may be operated at temperatures within the acceptable working temperature range, thus greatly enhancing the reliability and the work life of the electrical elements.

At present, the optimal storage state of the lithium battery cells in the battery pack is the rated nominal voltage, where the charge capacity of the battery cells is about 40-50%. However, the users usually dispose fully discharged battery packs in the charger, and do not remove the battery pack from the charger until the next use, after the battery pack has been fully charged. If the battery pack is left in a fully charged state for an extended period of time, the capacity of the battery cells will be reduced, and the work life of the battery cells will be diminished. The present invention provides an intelligent charging system to maintain the capacity of the battery cell, ensure an extended discharging time, and maximize the work life of the battery cells. As referenced above, the 56 V battery pack of the illustrated embodiment may be used for the garden tools, such as a cordless mower. After the user finishes operating the garden tool, the user may dispose the battery pack in the charger for an extended period of non-use. In the illustrated embodiment, the intelligent charging system determines whether the garden tool is likely to be left in an extended period of non-use. If so, the intelligent charging system will discharge the battery pack until it reaches the optimal storage voltage, 50.4V (3.6V per battery)—this is called the storage state. Maintaining the battery pack at the storage state will avoid loss of battery capacity, and increase battery work life. However, if the battery pack is likely to be used frequently, the intelligent charging system will keep the battery pack fully charged in a standby state.

Figure 6:
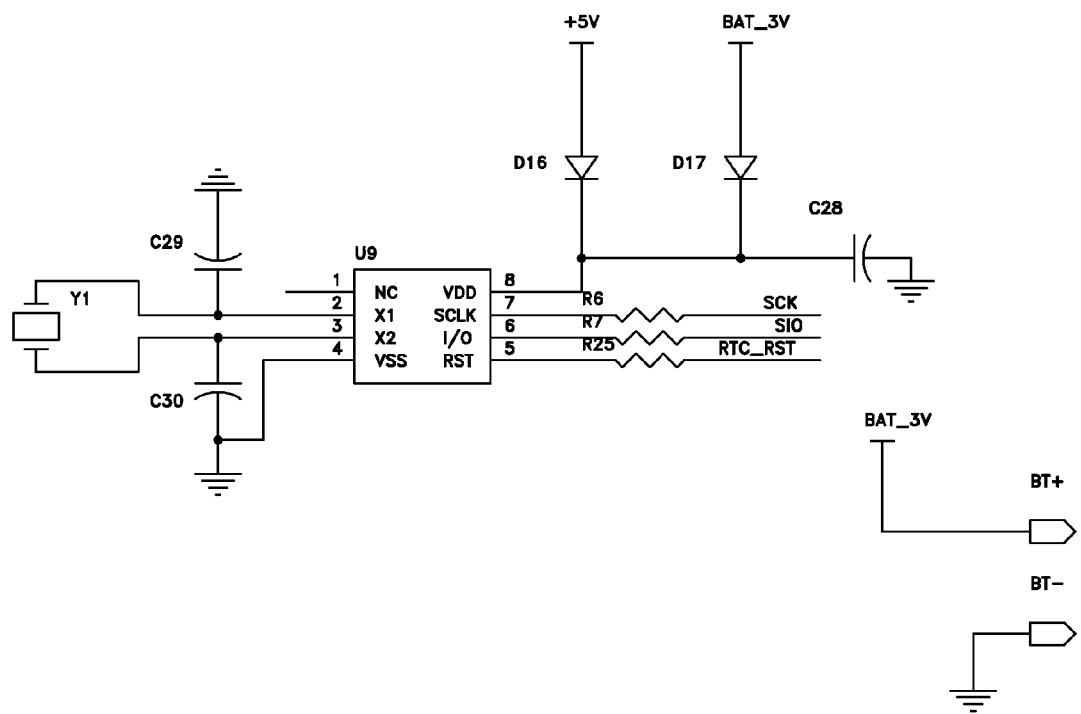
FIG. 6 is a circuit diagram of a real time clock in the charging system.

As shown in FIGS. 5 and 6, the intelligent charging system, according to the illustrated embodiment, contains a real time clock circuit. In this embodiment, the intelligent charging system determines whether to keep the battery pack at a storage state or standby state depending on the time of year. For example, garden tools are more frequently used from May to October, and less frequently used from November to April. According to this usage characteristic, the present embodiment comprises the following steps: After the user uses the garden tool, the user disposes a fully-discharged battery pack in the charger; the intelligent charging system determines the calendar time using the real time clock circuit; if it is between May and October, the intelligent charging system instructs the charger to fully charge the battery pack to a standby state; if it is between November and April, the intelligent charging system instructs the charger to charge the battery pack to a storage state, 50.4V (3.6V per battery).

According to the illustrated embodiment, at the end of October, the intelligent charging system will transition the battery pack from a standby state to a storage state. The intelligent charging system discharges the fully-charged battery pack, using the circuit board, until it reaches the storage state of 50.4V. Similarly, at the beginning of May, the intelligent charging system will transition the battery pack from a storage state to a standby state by instructing the charger to fully charge the battery pack.

In another embodiment, the intelligent charging system may also detect the time of year by measuring the environmental temperature using the above-referenced temperature measuring circuit. For example, the intelligent charging system may measure the temperature of a battery pack that has not been used for an extended period of time to determine whether it is summer or winter. In summer, the intelligent charging system will instruct the battery pack to maintain its fully-charged standby state. In the winter, the intelligent charging system will instruct the circuit board to discharge the battery pack until the battery pack reaches its storage state of 3.6V per battery cell.

In another embodiment, the intelligent charging system may discharge the battery pack to a storage state if the battery pack has remained idle (that is charged or discharged) for a certain period of time, such as 30 days. After the battery pack has remained idle for a certain period of time, such as 30 days, the intelligent charging system may instruct the circuit board to immediately discharge the battery pack to a storage state of 3.6V per battery cell. If a user wishes to use a battery pack that is in a storage state, the user may press a power display key, and the battery pack will be charged to a fully-charged, standby state. The battery pack may be used after it is fully charged.

The state of the battery pack may be automatically chosen by the intelligent charging system, or it may be manually chosen by a user. For example, a user may use a control switch on the operation panel to manually choose whether the battery pack should be maintained at a storage state or a standby state. The operation panel may be arranged on the battery pack, the charger or the housing.

The intelligent charging system may be arranged in the controller of the battery pack similar to a MCU, or it may be arranged in the controller of the charger. Under the present invention, the battery packs may be either a built-in or a removable battery pack. If the battery pack is built-in, the intelligent charging system may be arranged in the housing.

Figure 7:
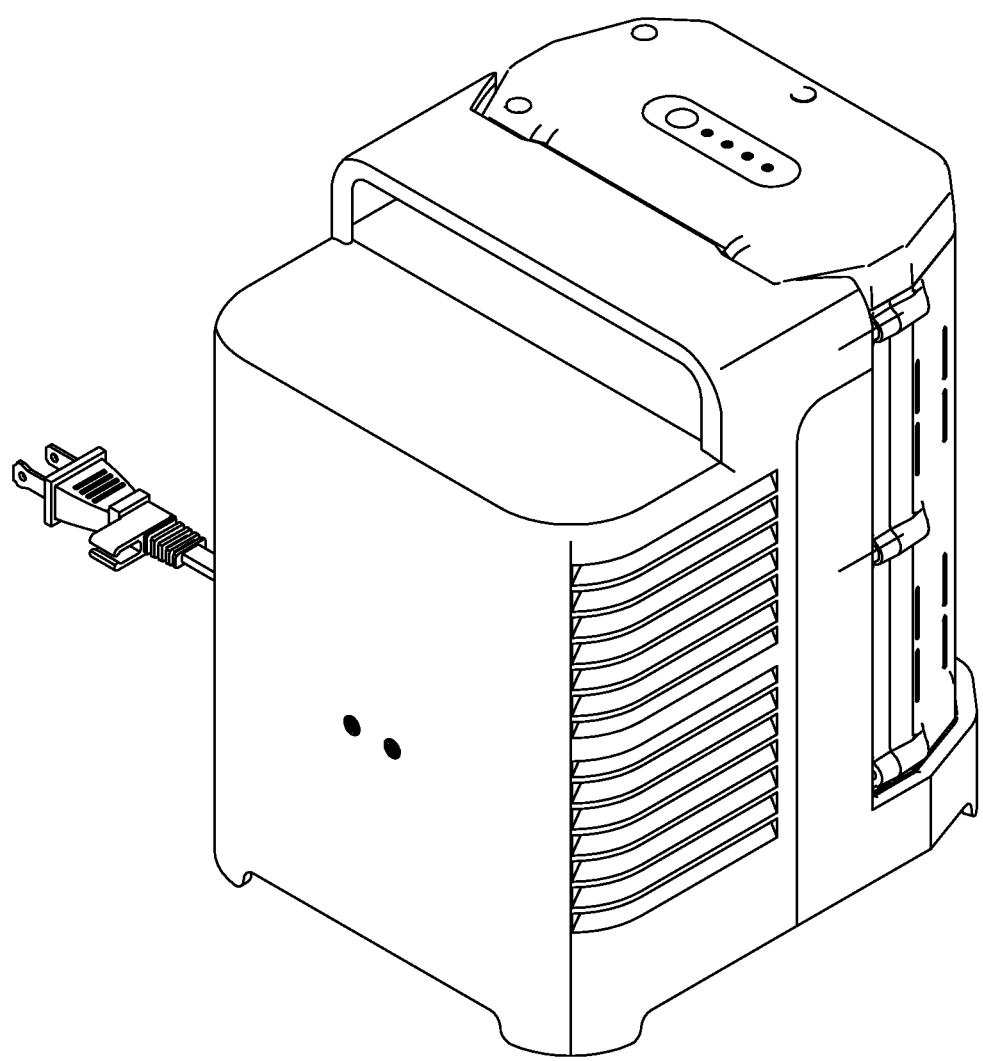
FIG. 7 is a illustrative view showing the charging system with the battery pack.
Figure 8:
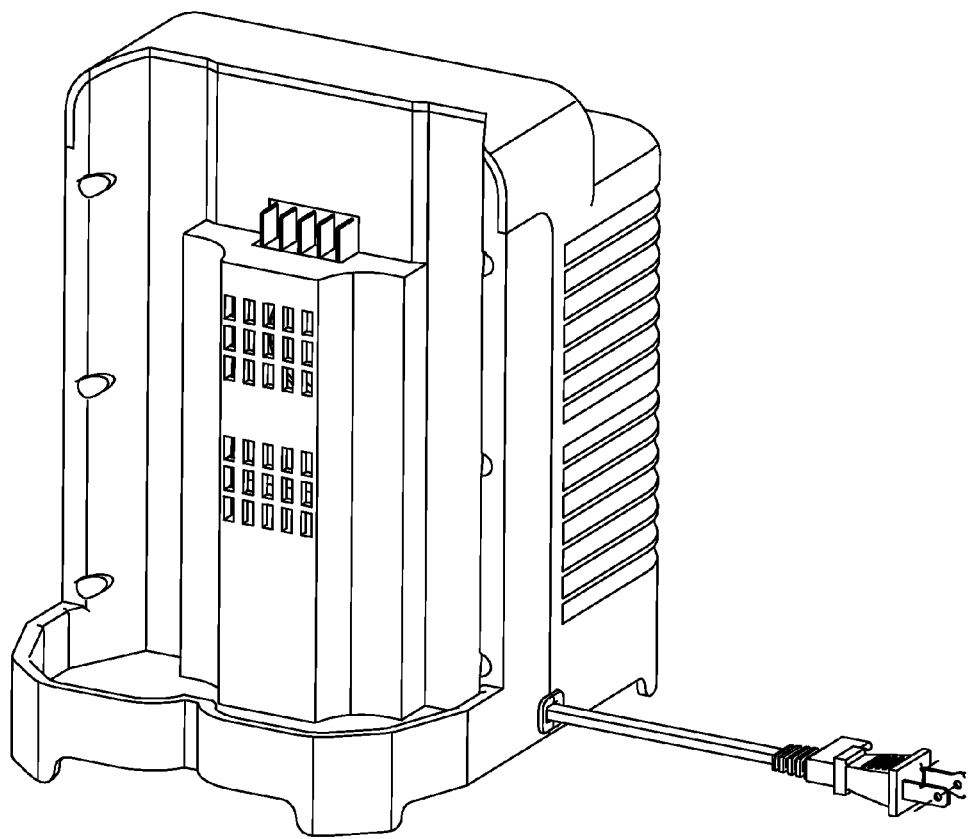
FIG. 8 is an illustrative view showing the charging system without the battery pack.
Figure 9:
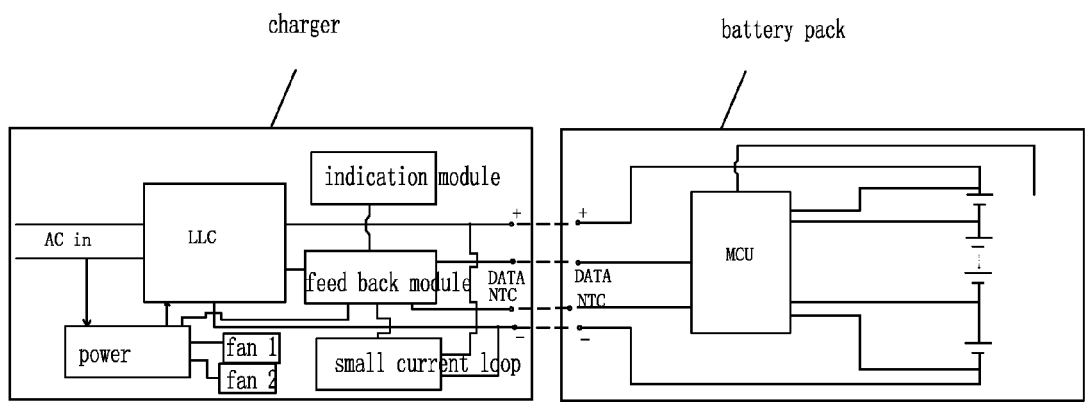
FIG. 9 is a circuit diagram illustrating the charging process in a charging system.
Figure 11:
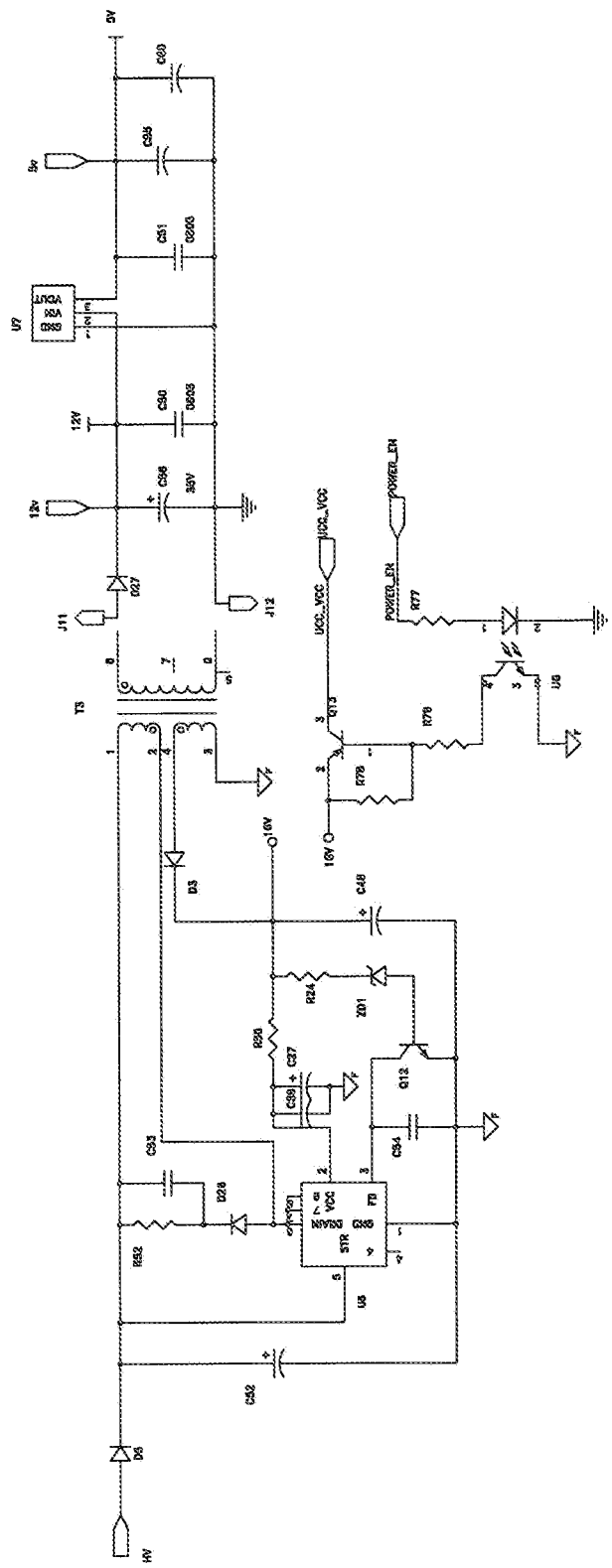
FIG. 11 is a schematic diagram illustrating a standby power module arranged in the charger system.

The present invention also provides a charging system for continuous and circular discharge of a plurality of battery packs. FIGS. 7 and 8, respectively show the charger 2 with the battery pack 100 and the charger 2 without the battery pack. FIG. 9 is a schematic diagram illustrating the charging of the cordless system of the present invention. The charger 2 includes a PCB components module comprising: a standby power module, shown in FIG. 11, which supplies power to the controlling system and the assistant system including a fan and LED; and a LLC module, shown in FIG. 12, which may satisfy the change requirement for the input and output under the conditions of zero current switch and zero voltage switch by optimally designing the parameters of the LLC resonant converter.

Figure 12:
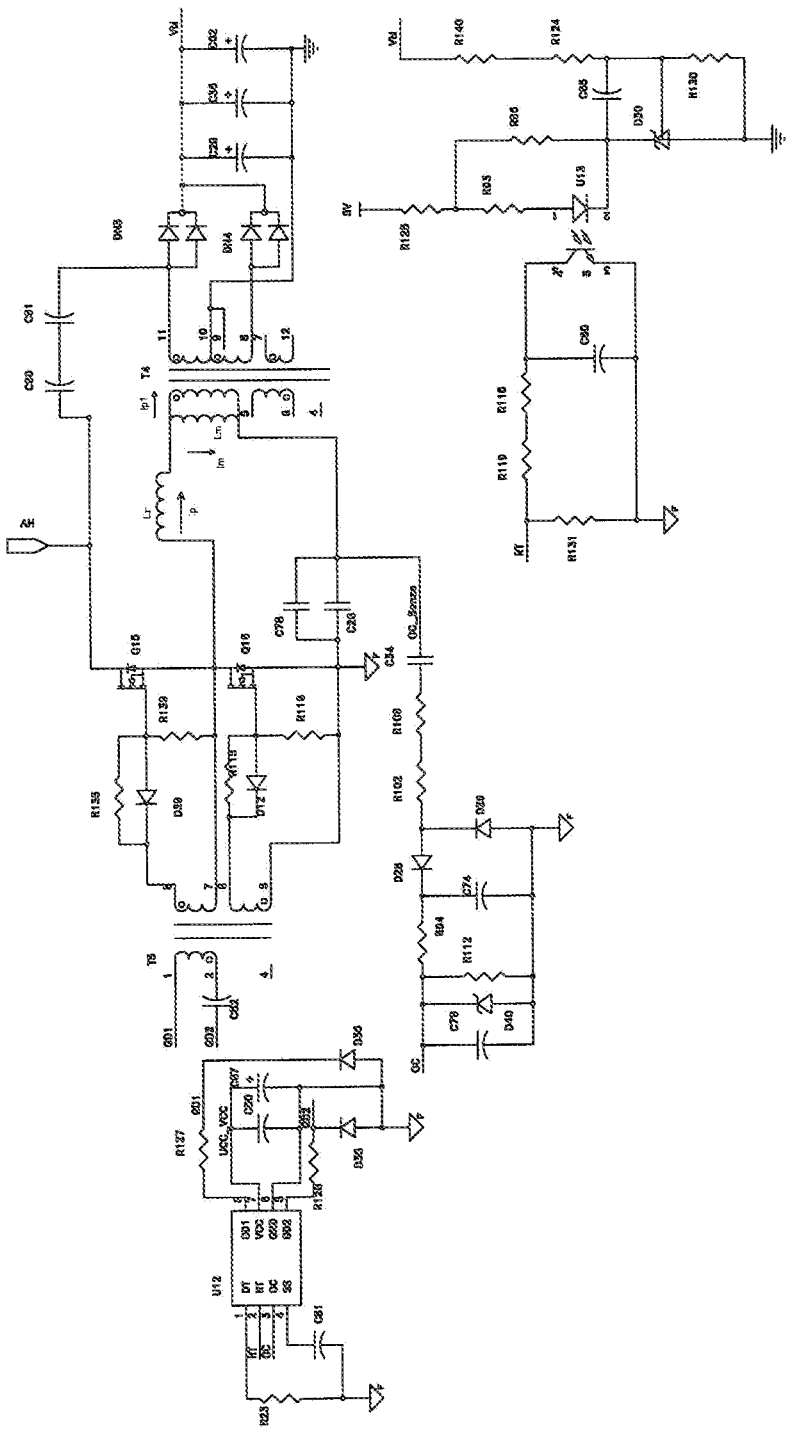
FIG. 12 is a schematic diagram illustrating a LLC module arranged in the charger system.

FIG. 12 illustrates the topology of the main circuit of the LLC resonant converter of the half bridge construction. The half bridge construction is configured as two main switches Q15 and Q16, the driving signals of which are complementary signals with constant duty cycle of 0.5. The LLC resonant network consist of a series resonant inductor Lk, a series resonant capacitor C78 and a parallel resonant inductor Lp. On the secondary side of the transformer, the commutation diodes DN3 and DN4 form a commutation circuit, and the commutation diodes are directly connected to the output capacitances C28, C36, C62. When the current iLp in the parallel inductor Lp is larger than the current ip in the resonant channel, the current ip1 is greater than zero, and the primary side transports power to the secondary side. When the voltages on the two ends of the parallel inductor are clamped, and only the series resonant inductor Ls and the series resonant capacitor Cs participate in the resonance, the resonant frequency is referred to as series resonant frequency, and referred to as fs. When the current iLp in the parallel inductor rises linearly to equal to the current ip in the resonant channel under the action of clamped voltage, the current is decreased to zero, and the primary side no longer provides power to the secondary side. At this time, the parallel resonant inductor Lp together with the series resonant inductor Ls and the series resonant capacitor Cs participate in the resonance and the resonant frequency is referred to as series parallel resonant frequency, or fm. When the working frequency of the switch is under fm, the transformer works in capacitive mode. When the switching frequency is between fm and fs, the transformer works in inductive mode, and the secondary commutation diode is off with zero current, thus the power density is higher, and there is less wear and tear on the switch. With this solution, the efficiency may be increased to 93%, the charging current may approach or surpass 8 A, and the charging efficiency is increased.

Figure 10:
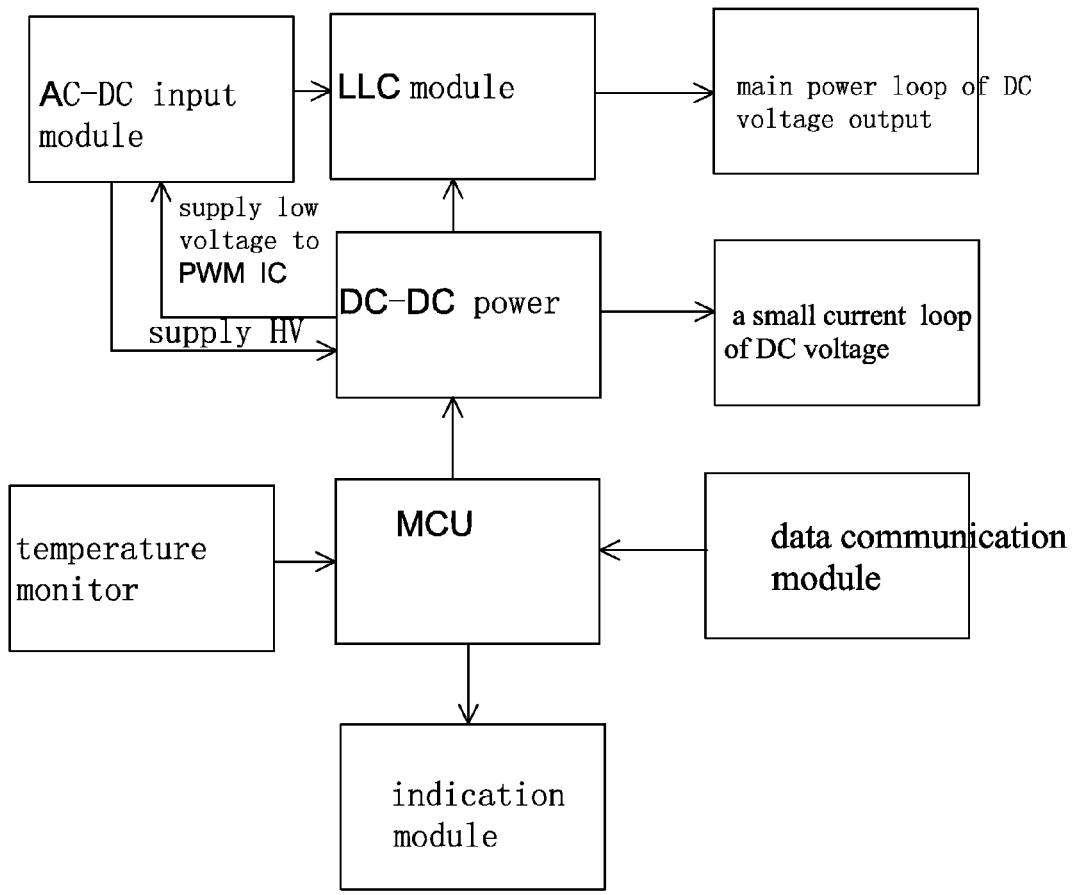
FIG. 10 is a schematic diagram illustrating the charging system.

FIG. 10 is a circuit diagram of the charging system. In the illustrated embodiment, because of characteristics of the LLC switch power, when the battery is over-discharged and needs to be charged, a small current charging loop is set up to activate the battery pack to avoid resetting the switch power. For example, if the battery pack is inserted into the charger, and the charger does not receive a normal instruction, the resistance of the NTC interface may indicate that the inserted battery pack is over-discharged. Thus an appropriate voltage is set and the small current charging loop is activated. If the NTC resistance cannot be detected, the NTC interface may indicate that the battery pack has been removed. When the battery voltage rises to the normal voltage, the charger begins to receive instructions.

When the battery pack is over-heated during the charging process, and remains over-heated for a certain period time, the charger may automatically pull the communication pin down. At this time, the battery pack will detect that the charger has been removed, while the charger may detect whether the battery pack has been removed depending on NTC resistance.

When the error alarm of the battery pack is activated during the charging process, and remains activated for a certain period time, the charger may reset the communication pin. If, afterward, the battery pack proceeds to charge normally, the error alarm may be eliminated. If the error alarm remains activated for a certain period of time, the charger may pull the communication pin down automatically. At this time, the battery pack will detect that the charger has been removed, while the charger may detect whether the battery pack has been removed depending by NTC resistance.

When the voltage of the battery pack is relative low, an instruction is sent to the charger, and the charger may charge the battery pack with a current of 8 A (the normal constant current). When the voltage of the battery pack rises gradually to a certain value V1, an instruction is sent to the charger for charging the battery pack with a constant voltage V1. When the charging current reaches a certain value and it is detected by the battery pack, an instruction is sent to the charger for charging the battery pack with a constant voltage V2. When the charging current reaches a certain value, which is detected by the battery pack, an instruction is sent to the charger to stop the charging, and the green indicator lights up. This embodiment ensures that the charging and discharging process may proceed safely.

The charger is provided with two fans for dispersing heat from the charger and the battery pack respectively. The fans prevent heat from the charger from being transmitted to the battery pack, which consequently shortens the charging time of the battery pack.

As referenced above, in order to extend the discharging time of by the lithium battery pack, the illustrated embodiment utilizes a lithium battery pack with a large capacity of 56V. But unlike a lithium battery pack with a small capacity, the lithium battery pack with a large capacity has a low discharging capability, and it cannot provide a current large enough to, for example, start a the motor from the off position. Thus, the illustrated embodiment needs a soft start mode to slowly increase the current while gradually increasing the rotating speed of the motor until the rotating speed of the motor can supply the current required to start the motor. Specifically, the soft start mode is mainly composed of a signal collecting portion with a sensor for collecting the rotating speed of the motor, a controlling circuit of the motor and a controller of the housing such as the MCU.

The cordless mower may be disposed on the flat land (without load) or on the grass land (with load) during the soft start mode. The MCU increases the PWM duty ratio of the starting circuit of the motor, and the rotating speed of the motor also increases gradually. Meanwhile the MCU also detects the current and the rotating speed of the motor. If the MCU detects that the current of the motor exceeds the protection value, the MCU stops increasing the PWM duty ratio, and the present PWM value is maintained for a certain time. If the current is not reduced during this time, the MCU indicates that the load is overloaded, thus the soft start process should be stopped, and the motor should be powered off in preparation for shutdown. If during the soft start process, the current value does not exceed the protection value, the soft start process continues until the MCU detects that the rotating speed has reached a given value. The soft start mode may solve the low discharge capability of the lithium battery in the illustrated embodiment, and prevent abnormal starts. Moreover, it reduces the influence of the large current discharge on the life of the battery cell and extends the work life of the battery.

To extend the discharging time of the battery pack, it is very important to enhance the utilization efficiency of the battery. The cordless mower of the illustrated embodiment has different work modes, including grass-collecting mode, and grass-cutting mode. For the cordless mower of the illustrated embodiment, it is very important to enhance the utilization efficiency provided by the battery. That efficiency depends on the following factors: the advancing speed, the loading (that is, the rotating speed of the motor), and the method used for collecting grass. The advancing speed is directly proportional to the rotating speed, thus to obtain preferable grass-cutting results, the rotating speed must be high if the advancing speed is high. In the grass collecting mode, the effect of grass-collecting is better if the rotating speed is higher since the grass needs to be collected. In the grass-striking mode, the rotating speed may be lower since grass doe not need to be collected, and the battery cells operate more efficiently.

Figure 13:
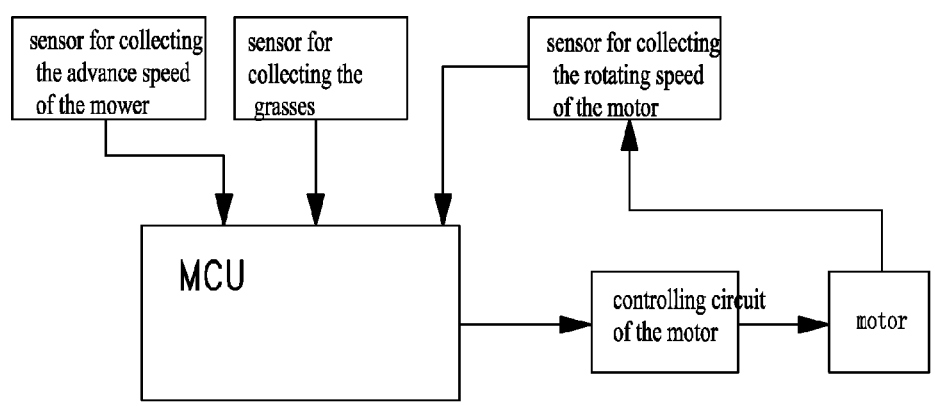
FIG. 13 is a schematic diagram illustrating an intelligent speed adjusting module of the mower.

The illustrated embodiment shown in FIG. 13 primarily includes a signal collection portion which is composed of a sensor for detecting the advancing speed of the cordless mower, a sensor for determining whether the mower is in grass-collecting mode or grass-striking mode, a sensor for detecting the rotating speed of the motor, a calculation and control process portion obtained by a housing controller such as MCU, and a controlling circuit for the motor.

The illustrated embodiment comprises the following steps: detecting the advancing speed of the cordless mower; detecting whether the mower is in grass-collecting mode or grass-striking mode (e.g.: the sensor for collecting the signal may be HALL, a photoelectric sensor or a mechanical mechanism); calculating and processing by a MCU to determine the necessary rotating speed for the motor; outputting a PWM signal to the controlling circuit of the motor; controlling the switch of the motor using the controlling circuit; and adjusting the PWM duty ratio according to the rotating speed of the motor so that the rotating speed may be maintained at a given rotating speed, thereby achieving an intelligent constant speed.

According to the process above, the cordless mower automatically adjusts to an automatic speed to achieve intelligent constant speed and thus reduce the inefficient power loss. If the cordless mower has a quick advancing speed and high load, the battery pack can timely provide high power to enhance the effect of grass cutting and increase the utilization efficiency of the battery pack.

Figure 14:
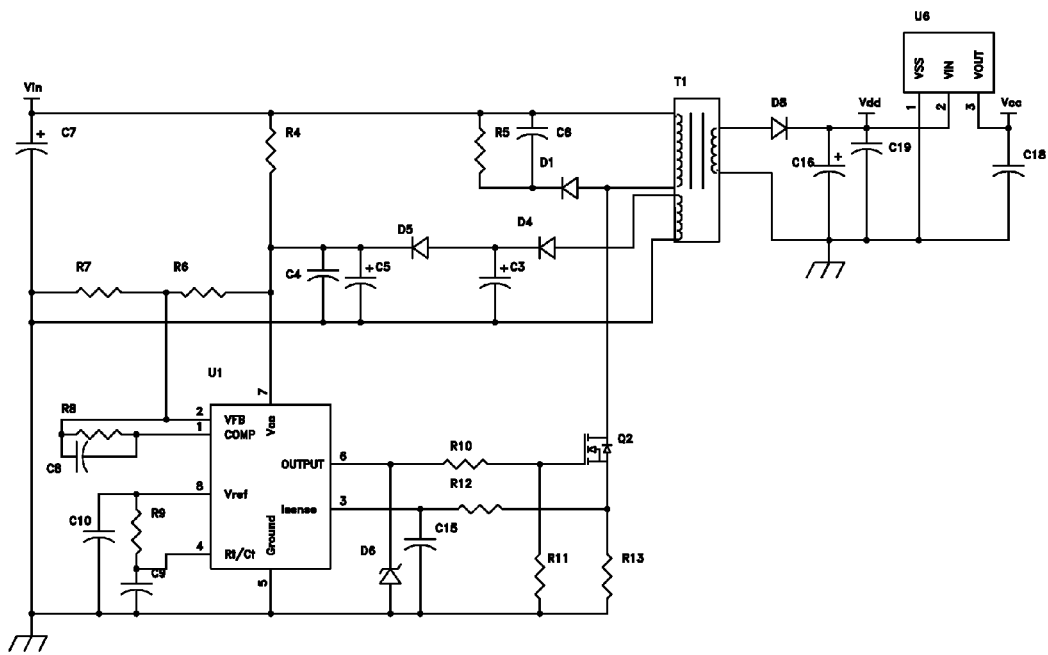
FIG. 14 is a circuit diagram illustrating a circuit module of a switch power.

The illustrated embodiment uses a battery pack of 56 V. If the power source in the controller has a linear voltage decrease mode, the efficiency of the power source is relatively low. The illustrated embodiment uses a Flyback switch power source to address the technical problem above. As shown in FIG. 14, the device in the illustrated embodiment is composed of a switch transformer (T1), a control chip (U1), MOSFET (Q2) and a power source chip (U7). The illustrated embodiment comprised the following steps: after the battery is connected to the circuit, the power of the control chip U1 is provided by R4 to start U1; a PWM signal is outputted to drive Q2, and the windings 1, 2 of the switch transformer T1 begin to work; after the windings 3,4 of T1 are coupled to create an induced voltage which may cross D4, D5 to provide the control chip with a working power source, and be divided for voltage by R6, R7 so as to provide the control chip with a reference voltage for controlling the switch on and switch off of Q; after Q2 is switched on, the voltage across the two ends of R13 begins to rise, and when it rises to the voltage across the two ends of R7, Q2 is switched off by the control chip, and the windings between the transformers 5, 6 create a voltage for supplying power to the control circuit.

Since the illustrated embodiment uses a Flyback switch power source, the input range is very wide and allows input voltages from ten volts to several hundreds volts. That is, the power source cannot be invalidated by the impact with high voltage even if a back electromotive force of more than one hundred volts caused by the locked-rotor motor is applied to the power source, thereby providing a good basis for the normal and stable work of the whole controller.

Besides the above embodiments, the present invention may consist of a blade directly driven by the shaft of the motor, thus eliminating the energy loss during the transmission between the shaft and the blade, and to reduce the loading of the blade and the no-load loss of the machine.

What is claimed is:

1. A cordless tool system, comprising:
a tool;
a lithium based battery pack for supplying power to the tool; and
a heat absorbing device operably coupled to the lithium based battery pack, wherein the heat absorbing device comprises a phase-change material, the phase-change material comprising a mixture of 80%-90% sodium acetate, 1%-5% sodium dodecyl benzene sulfonate, 1%-5% carboxymethyl cellulose, and 1%-5% sodium carbonate, wherein the tool has a power of equal to or more than 300 W, and wherein the ratio of discharging time to charging time of the lithium based battery pack is approximately 25:35.

2. The cordless tool system as recited in claim 1, comprising an intelligent charger for releasably receiving and charging the lithium based battery pack.

3. The cordless tool system as recited in claim 2, wherein the tool has an average working current of equal to or more than 12 A.

4. The cordless tool system as recited in claim 2, wherein the intelligent charging system charges the lithium based battery pack to one of a fully charged state and a storage state.

5. The cordless tool system as recited in claim 2, wherein the intelligent charging system charges the lithium based battery pack with a charging current of approximately 8 A.

6. The cordless tool system as recited in claim 1, wherein the lithium based battery pack has a battery capacity of approximately 4 Ah.

7. The cordless tool system as recited in claim 1, wherein the tool comprises a mower.

8. The cordless tool system as recited in claim 7, wherein a discharging time of the lithium based battery pack when used to power the mower is approximately 30 minutes.

9. The cordless tool system as recited in claim 1, wherein the lithium based battery pack is removeably attachable to the tool.

10. The cordless tool system as recited in claim 1, comprising a temperature measuring device associated with the lithium based battery pack.

11. The cordless tool system as recited in claim 10, wherein the temperature measuring device comprises at least one electronic element with a PN junction.

12. The cordless tool system as recited in claim 10, wherein the temperature measuring device comprises at least one triode.

13. A cordless tool system, comprising:
a tool;
a lithium based battery pack for supplying power to the tool; and
a heat absorbing device operably coupled to the lithium based battery pack, wherein the heat absorbing device comprises a phase-change material, the phase-change material comprising a mixture of 80%-90% sodium acetate, 1%-5% sodium dodecyl benzene sulfonate, 1%-5% carboxymethyl cellulose, and 1%-5% sodium carbonate, wherein the tool has a power of equal to or more than 300 W and an average working current of equal to or more than 12 A, and wherein the lithium based battery pack has a nominal voltage of equal to or more than 56V.

14. A cordless tool system, comprising: a tool; a lithium based battery pack for supplying power to the tool; and
a heat absorbing device operably coupled to the lithium based battery pack, wherein the heat absorbing device comprises a phase-change material, the phase-change material comprising a mixture of 90%-99% polyethylene glycol and 1%-10% cda cellulose diacetate, wherein the tool has a power of equal to or more than 300 W, and wherein the ratio of discharging time to charging time of the lithium based battery pack is approximately 25:35.

* * * * *